Patented Dec. 30, 1924.

1,521,541

UNITED STATES PATENT OFFICE.

YOSHIHO INADA, OF TAKAW, FORMOSA, JAPAN.

METHOD OF MAKING CARBONS.

No Drawing.   Application filed September 8, 1920. Serial No. 408,977.

*To all whom it may concern:*

Be it known that I, YOSHIHO INADA, subject of the Emperor of Japan, residing at 193 Minato-chio, Takaw, Formosa, Japan, have invented certain new and useful Improvements in Methods of Making Carbons, of which the following is a specification.

This invention relates to a method for making carbon for decolorization and has for its object to drive out the volatile matters by stirring and heating a fragrant resiniferous wood to such an extent that it does not become charred, and consists of impregnating the same with a soluble material, and then heating the material to be carbonized to a high temperature in absence of air, washing the material with hot water, then acid, and finally the refining processes are carried on.

A further object of the invention is to get the most efficient carbon for absorbing the coloring matters and impurities contained in cane juice or sugar liquors, and not only the sugar liquors, but also glucose solution, glycerine, vinegar and the like.

The treatment drives a fragrant volatile resin entirely out of saw-dust or wood chips of Hempaku (*Chamaecyparis obtusa*) Beni-Hinoki (a kind of *Chamaecyparis pisifera*) of Mt. Ari, or the like and comprises stirring and gently heating of the material to such an extent that it does not char: impregnate the material with a solution of an easily soluble salt such for instance as potassium acetate: drying the material: carbonizing the material at a high temperature in the absence of air: soaking the carbonized material in hot water and then acid to dissolve the impurities; subjecting the material to washing and refining processes and finally again heating thereby producing a pure carbon for decolorization.

The following is the details of this invention as an example.

(1) Process of removing volatile resin: The saw dust or wood chips of Hempaku or Beni-Hinoki of Mt. Ari is put into a vessel, stirred gently and heated to such an extent that the material is not charred and to drive out the fragrant volatile resin.

(2) The material is impregnated with alkaline salts: The saw dust heated as above is mixed well with an alkaline salt (such as potassium acetate) in a thick solution. It will be seen that the alkaline salts will enter minute pores in the wood. The proportion of potassium acetate to be mixed with the saw dust is as follows. The saw dust previously heated, one hundred parts. Potassium acetate, forty parts. After impregnation the material is heated until dry, care being taken that it does not ignite.

(3) Process of carbonizing: The dried saw dust treated as above set forth is then put into a gas retort for carbonization, where the material is heated at 450° C. for the first one hour, then at about 1000° C. for the second hour, without any quantity of air entering the retort and is then taken out exposed to the air a few minutes, and then cooled in a closed vessel.

(4) Process of powdering: The carbon after being cooled is ground to a fine powder in preparation for the next treatment.

(5) Process of washing with water: To remove all the materials soluble in water, the powdered carbon is supplied with water, and then pumped into a filter press to separate the water which dissolved those soluble salts or the like contained in the raw carbon.

(6) Process of washing with acetic acid: The material not being free from some salts which are not soluble in water, the washed carbon is placed in a wooden tank and then a weak solution of acid is added such for instance as acetic acid, which is a by-product obtained in certain quantities during the process of carbonizing until it is slightly acid. The material is stirred for about 48 hours to eliminate soluble salts or the like. Then the mixture is heated to a boiling state in the tank by steam jets before pumping into another filter press in which the superfluous water is separated and the material washed well with hot water and later with steam until the filtrate is substantially pure.

(7) Process of finishing: To finish the refining of the carbon in the filter press, the material is finally pumped through a quantity of pure water containing a small amount of ammonia, and then through pure water alone. The carbon becomes almost pure and the last traces of acid are some acetates.

(8) Process of drying: The carbon comes from the filter press, is transferred into a predryer and then into a closed steel kettle heated by direct fire where the carbon becomes red hot for a while and is then cooled in a vacuum. It may then be packed as desired.

(9) Process of recovery of by-products:

With the gases from the retort during the carbonization operation, two products are separated, one a noncondensible gas and the other a fluid.

The noncondensible gas is sent to a gas holder and then to the furnace of the retort as fuel. From the fluid by-products such as acetic acid, wood sprits are recovered and others separately by well known methods such as cooling or distilling. The acetic acid may be used in the washing process.

A thick solution of alkaline salts is obtained by concentrating the filtrate obtained during the process of washing with water and acetic acid and they are utilized in the process of impregnating.

By the above mentioned method of manufacturing the carbon is finished, and the quantity of the carbon is about 20% of the raw material, (saw dust).

Where sugar liquor is used it has been found that the carbon obtained has a prompt settling and strong decolorizing property and makes filtration easy. Its decolorizing power is so strong that even by using only 1.5% by weight of carbon for the total solid matter in the sugar liquor, an absolutely clear bright liquor may be obtained.

This carbon can revivify the decolorizing power by treating with caustic soda and can be repeatedly used.

Compared with other carbons for decolorization, which impregnate chemicals directly into raw materials such for instance as saw dust, without previously heating the carbon is obtained by the present method and is stronger in decolorizing and makes the filtrate more brilliant. Comparing the carbon made by the method of this invention with any other carbon which is obtained from coniferous trees but not having a fragrant volatile resin, the decolorization by the present method is far better than in the methods now in use, and therefore the use of coniferous trees which abound in a fragrant volatile resin is essential for the preparation of decolorizing carbon. Although coniferous trees are used which abound in fragrant volatile resin, if the process of driving away the volatile matters by heating before impregnation is neglected the carbon obtained is the same as carbon obtained by the use of ordinary pine trees. On the contrary if ordinary pine trees are subjected to treatment under the present method the carbon obtained is more powerful in the point of filtration and decolorization than carbon which does not drive away the volatile matters before decarbonization, therefore the process of driving out the volatile matter, by heating, before impregnation of soluble salts is very important in the manufacture of carbon for decolorization.

The invention having been set forth what is claimed as new and useful is:—

A method of obtaining a decolorizing carbon by treating Japanese coniferous wood having a fragrant volatile resin, said method comprising first driving out the volatile material by heat; impregnating the residue with a potassium acetate, and finally driving away the impregnating agent potassium acetate.

In testimony whereof I affix my signature in presence of two witnesses.

YOSHIHO INADA.

Witnesses:
KUYOSHI YOSHIDA,
CHUHEE MATSUO.